Patented Aug. 9, 1949

2,478,680

UNITED STATES PATENT OFFICE 2,478,680

SULFURIC ACID CONCENTRATION

Clayton M. Beamer and Mack C. Fuqua, Baton Rouge, La., assignors to Standard Oil Development Company, a corporation of Delaware No Drawing. Application April 11, 1946, Serial No. 661,329

4 Claims. (Cl. 23—173)

This invention relates to the field of sulfuric acid concentration and relates more particularly to the concentration of sulfuric acid from processes using this acid as an absorption agent for olefins which are to be hydrated.

Olefin hydration processes in brief consist in the absorption of an olefin in 60-98% sulfuric acid or other similar absorption agent which forms an extract containing alkyl acid esters. The extract is then diluted with water to an acid concentration of 35-50% acid strength on an olefin-free or alcohol-free basis, hydrolyzed and steam stripped to recover alcohol. The concentrations of the absorption media vary according to the olefin to be absorbed, i. e. ethylene requires about 98% sulfuric acid for absorption, propylene about 60-92% acid, higher molecular weight normal olefins about 55-88% acid and the tertiary olefins can be reacted with acid of lower concentrations. For the hydrolysis of the acid extracts derived from these olefins, the extract is in most instances diluted to an acid concentration between 35 and 50% and steam stripped to recover the alcohol. The residue from the distillation or stripping step is a weak acid, commonly designated as slop acid, having an acid concentration of from 35-50% on an alcohol-free basis. This acid is then concentrated to a strength of about 70% by indirect heat exchange with a heat exchange medium such as steam, vapors of diphenyl, diphenyl oxide, or mixtures thereof or other liquid or vaporous media of the proper temperature level. This acid is then further reconcentrated in a second step to the desired strength for further absorption of olefins. The acid may be submitted to a pressure distillation with live steam to remove polymeric materials prior to the reconcentration steps, if desired.

In commercial plant practice it is usual to fabricate the equipment in which sulfuric acid is concentrated from acid resistant alloys to prevent corrosion by the acid. This is particularly true of the vessels used in reconcentrating spent sulfuric acid from alcohol manufacture. For example, the tubes and walls of such acid reconcentrators may be fabricated from Hastelloy D metal, an acid resistant alloy consisting of 85 to 86% nickel, 3% copper, 1% manganese, 10% silicon, with or without 1% aluminum.

While the above or similar alloy has been found suitable for use in concentrating spent acid containing carbon compounds capable of forming solid carbonaceous material, corrosion difficulties have been encountered even with this alloy when concentrating spent acid which does not contain carbon compounds capable of forming solid carbonaceous material under the concentrating conditions.

It is, therefore, the main object of this invention to so precondition the metal surfaces of the vessel used in concentrating sulfuric acid that the acid does not corrode the alloy with which the heating surface is fabricated. This and other objects of the present invention will be apparent to those skilled in the art upon reading the following description.

According to the present invention, therefore, the vessel in which sulfuric acid is to be concentrated is first cleaned, filled with dilute sulfuric acid of about 70% concentration containing carbon compounds capable of forming a carbonaceous coating on the heating surfaces of the vessel and heated for several hours to deposit a layer of carbon on the heating surfaces. The invention is particularly directed to the preconditioning of the heating surfaces of the vessels used for reconcentrating the dilute acid from the manufacture of isopropyl or higher alcohols. According to this method, the vessel to be subsequently used for reconcentrating spent acid from the manufacture of isopropyl or other higher alcohol is first heated with spent acid containing a large amount of carbonaceous material and then used to reconcentrate the specific process acid. By heating with the acid containing the carbonaceous material, a thin coating of carbonaceous material is deposited on the heating surfaces of the vessel. This carbon coating can be maintained continuously effective by subjecting the heating surfaces of the concentrating vessel to the treatment with the spent acid at definite intervals. This method has been applied in commercial operations for the preparation of isopropyl alcohol with excellent success. In such an operation, the vessel in which the acid from the manufacture of isopropyl alcohol is to be reconcentrated, is filled with spent acid obtained in the manufacture of ethyl alcohol and having a concentration of 70% on an alcohol and hydrocarbon free basis and heated for at least two hours whereupon the heating surfaces of the vessel were found to be coated with a layer of carbonaceous material. The number of tube failures due to corrosion in commercial installations in which this procedure has been adopted has been appreciably reduced.

While the above method represents the preferred embodiment of this invention, similar results may be obtained by adding carbonaceous material to sulfuric acid from any source and heating this acid in the concentrating vessel according to the above procedure until a carbon coating is deposited.

The nature and objects of the present invention having been thus fully set forth, what is claimed as new and useful and desired to be secured by Letters Patent is:

1. In reconcentrating a spent aqueous sulfuric acid in a heating zone enclosed by metallic surfaces subject to corrosion by said spent acid and wherein metallic heating surfaces are subject to corrosion by exposure to said spent acid undergoing reconcentration, the improvement which comprises first reconcentrating a spent sulfuric acid which contains carbonaceous material that forms a thin carbonaceous coating on said metallic surfaces during the reconcentrating, subsequently in said heating zone wherein the metallic surfaces are thus coated reconcentrating said spent aqueous sulfuric acid which would corrode the metallic surfaces when they are not thus coated, and at intervals repeating the coating of said metallic surfaces by reconcentrating in said treating zone spent sulfuric acid that forms a thin carbonaceous coating on the metallic surfaces, so that they are continuously protected from corrosion as the heating zone is further used to reconcentrate additional quantities of said spent aqueous sulfuric acid which would corrode the metallic surfaces when they are not thus coated.

2. In reconcentrating spent aqueous sulfuric acid resulting from the hydrolysis of sulfuric acid-extracted propylene for production of isopropyl alcohol by heating said spent acid in a heating zone enclosed by metallic surfaces subject to corrosion by said spent acid and wherein metallic heating surfaces are subject to corrosion by exposure to said spent acid undergoing reconcentration, the improvement which comprises first reconcentrating in said heating zone a spent sulfuric acid resulting from hydrolysis of sulfuric acid-extracted ethylene to ethyl alcohol until a thin carbonaceous coating is formed on said metallic surfaces, subsequently in said heating zone wherein the metallic surfaces are thus coated reconcentrating the spent acid in which the isopropyl alcohol has been produced, and at intervals reconcentrating more of spent acid resulting from hydrolysis of sulfuric acid-extracted ethylene so that said metallic surfaces are continuously protected from corrosion by a thin carbonaceous coating as the heating zone is further used to reconcentrate additional quantities of the spent acid from hydrolysis of sulfuric acid extracted propylene.

3. In the process defined by claim 2, the spent sulfuric acids reconcentrated have an acid concentration of 35 to 50%.

4. In the process defined by claim 2, said metallic surfaces being an alloy which consists of about 85 to 86% nickel, 3% copper, 1% manganese, and 10% silicon.

CLAYTON M. BEAMER.
MACK C. FUQUA.

REFERENCES CITED

The following references are of record in the file of this patent:

UNITED STATES PATENTS

| Number | Name | Date |
|---|---|---|
| 1,932,954 | Conradty | Oct. 21, 1933 |
| 2,041,392 | Bean | May 19, 1936 |
| 2,414,727 | Ellender | Jan. 21, 1947 |